US006248427B1

(12) United States Patent
Ast

(10) Patent No.: US 6,248,427 B1
(45) **Date of Patent: *Jun. 19, 2001**

(54) ADHESIVE LABEL

(75) Inventor: Hans-Peter Ast, Brannenburg (DE)

(73) Assignee: Zweckform Etikettiertechnik GmbH, Holzkirchen (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/694,572

(22) Filed: Aug. 9, 1996

(30) Foreign Application Priority Data

Aug. 16, 1995 (DE) .......................................... 295 13 170 U

(51) Int. Cl.[7] .......................................... C09J 7/02

(52) U.S. Cl. .......................... 428/203; 428/220; 428/354

(58) Field of Search .................................... 428/354, 203, 428/220

(56) References Cited

U.S. PATENT DOCUMENTS

| | | |
|---|---|---|
| 2,595,963 | 5/1952 | Lewis et al. . |
| 3,121,021 | 2/1964 | Copeland . |
| 3,518,152 | 6/1970 | Storti . |
| 3,535,293 | 10/1970 | Anderson . |
| 3,897,295 | 7/1975 | Dowbenko et al. . |
| 4,039,707 | 8/1977 | O'Malley . |
| 4,124,431 | 11/1978 | Schramer et al. . |
| 4,163,822 | 8/1979 | Walter . |
| 4,217,263 | 8/1980 | Magnotta . |
| 4,230,753 | 10/1980 | Sheyon . |
| 4,248,762 | 2/1981 | Hornibrook et al. . |
| 4,248,918 | 2/1981 | Hornibrook et al. . |
| 4,264,657 | 4/1981 | Tollette . |
| 4,313,986 | 2/1982 | Magnotta . |
| 4,627,154 | 12/1986 | Pattison . |
| 4,627,641 | 12/1986 | Kawaguchi . |
| 4,704,173 | 11/1987 | Hoffman . |

(List continued on next page.)

FOREIGN PATENT DOCUMENTS

| | | |
|---|---|---|
| 2095104 | 7/1994 | (CA) . |
| 2939466 | 8/1979 | (DE) . |
| 32-11331 | 10/1982 | (DE) . |

(List continued on next page.)

OTHER PUBLICATIONS

Duracell Information: Batterie Historie, undated.

Haftklebstoffbeschichtung Aus Der Sicht Der Industriellen Anwendung, H.P. Ast., undated.

Selbstklebe–Etiketten aus Kunstoff für Packmittal aus Kunststoff, H.P. Ast., published in Die Verpackung 1/84 Küsnacht.

(List continued on next page.)

*Primary Examiner*—Christopher Rahmund
(74) *Attorney, Agent, or Firm*—Arent Fox Kintner Plotkin & Kahn, PLLC

(57) ABSTRACT

An adhesive label for application upon a circumferential surface of a dry cell battery 50 having an axis and cover- and bottom-surfaces 51, 51 includes: a stretched, shrinkable, transparent cover foil with a top side and a bottom side, an imprint located beneath the cover foil visible from the top side and a contact adhesive layer located beneath the imprint, wherein the adhesive label 1 comprises first edge segments 19, 19 along a generation line of the circumferential surface of the battery 50 which can be superimposed in an overlapping manner and second edge segments 17, 17 projecting axially beyond the end surfaces 51, 51 of the battery, which end segments 17, 17 rest upon the end surfaces 51, 51 by shrinkage of the cover foil, wherein the imprint is applied directly upon the bottom side of the cover foil.

19 Claims, 3 Drawing Sheets

U.S. PATENT DOCUMENTS

| | | |
|---|---|---|
| 4,801,514 | 1/1989 | Will et al. . |
| 4,911,994 | 3/1990 | Will et al. . |
| 5,032,477 | 7/1991 | Will et al. . |
| 5,190,609 | 3/1993 | Lin et al. . |
| 5,262,251 | 11/1993 | Will et al. . |
| 5,292,566 | 3/1994 | Shacklett, III . |
| 5,312,712 | 5/1994 | Will et al. . |
| 5,326,654 | 7/1994 | Will et al. . |
| 5,328,738 | 7/1994 | MCKillip et al. . |
| 5,358,804 | 10/1994 | Will et al. . |
| 5,368,953 | 11/1994 | Zaborney et al. . |
| 5,665,443 | 9/1997 | Hata et al. . |
| 5,747,192 | 5/1998 | Hughen et al. . |
| 5,766,795 | 6/1998 | Will et al. . |

FOREIGN PATENT DOCUMENTS

| | | |
|---|---|---|
| 8216905 | 10/1982 | (DE) . |
| 32-45057 | 7/1983 | (DE) . |
| 3639772 | 6/1987 | (DE) . |
| 3823379 | 1/1990 | (DE) . |
| 3941257 | 6/1991 | (DE) . |
| 4211281 | 3/1992 | (DE) . |
| 0043243 | 1/1982 | (EP) . |
| 0180811 | 5/1986 | (EP) . |
| 0286222 | 10/1988 | (EP) . |
| 0358445 | 3/1990 | (EP) . |
| 0505689 | 9/1992 | (EP) . |
| 0506202 | 9/1992 | (EP) . |
| 2 680 132 | 2/1993 | (EP) . |
| 0368326 | 3/1994 | (EP) . |
| 0606699 | 7/1994 | (EP) . |
| 0 947 971 | 8/1996 | (EP) . |
| 1449743 | 7/1966 | (FR) . |
| 2459520 | 6/1979 | (FR) . |
| 2484115 | 6/1980 | (FR) . |
| 2501398 | 9/1982 | (FR) . |
| 2674979 | 10/1992 | (FR) . |
| 2 715 494 | 7/1995 | (FR) . |
| 1228858 | of 1908 | (GB) . |
| 1123187 | 8/1968 | (GB) . |
| 2103008 | 2/1983 | (GB) . |
| 2184672 | 7/1987 | (GB) . |
| 2193834 | 2/1988 | (GB) . |
| 2198412 | 6/1988 | (GB) . |
| 49-93459 | 9/1974 | (JP) . |
| 52-131124 | 11/1977 | (JP) . |
| 52-131126 | 11/1977 | (JP) . |
| 54-178785 | 6/1979 | (JP) . |
| 56-4675 | 1/1981 | (JP) . |
| 56-150545 | 11/1981 | (JP) . |
| 57-210563 | 2/1983 | (JP) . |
| 59-123161 | 7/1984 | (JP) . |
| 62-177864 | 8/1987 | (JP) . |
| 62177864 | 8/1987 | (JP) . |
| 63-164158 | 7/1988 | (JP) . |
| 1031346 | 2/1989 | (JP) . |
| 1289990 | 11/1989 | (JP) . |
| 4325679 | 11/1992 | (JP) . |
| 5066537 | 3/1993 | (JP) . |
| 5213566 | 8/1993 | (JP) . |
| 5225236 | 9/1993 | (JP) . |
| 5319758 | 12/1993 | (JP) . |
| 7-52311 | 2/1995 | (JP) . |
| 7-37103 | 4/1995 | (JP) . |
| WO 93/17462 | 9/1993 | (WO) . |
| 9419835 | 9/1994 | (WO) . |
| WO 94/19835 | 9/1994 | (WO) . |
| WO9642115 | 12/1996 | (WO) . |

OTHER PUBLICATIONS

Paper, Film & Foil Converter, Mar. 1985, p. 107.

L émballage En Matiére Plastique El Le Développement De LÉtiquetage Adhésif Plastique, Technigie Technologie, H.P. Ast, Mar. 1984, pp. 21–27.

Den här produkten blev en av de mest Iönsamma f+e,uml +ee r Svensk Fackhandel 1981, Sweden 1981, 14 sheets.

Pressure–Sensitive PVC Battery Covers From West Germany, USITC Publication 2265, Mar. 1990.

Haftetikett ersetzt Stahlmantel Super Power im neuen Anzug, Verpackungs–Rundschau Jun. 1983. Ast.

"Paper Converting" 1979, vol. 20, No. 4, pp. 1 to 8, and 22.

"Labels Makes Batteries Last Longer", Packaging, A Cahners Publication, May 1986.

*Handbook of Adhesives*, 3rd Edition, Irving Skeist, New York 1990, pp. 641–663.

Handbook of Adhesives, 2nd Edition, Irving Skeist, New York 1977, p. 552.

Memorandum, Avery Label Systems Ltd., Apr. 24, 1984.

Memorandum, Avery Label, Jan. 7, 1982.

*Pressure Sensitive Products*, Skeist Laboratories, New Jersey 1984, pp. 294 and 319.

O.D. Parfenov, *Technology of Micro–Circuits*, Moscow, 1986, pp. 248–249, "Insulation by Polyamide Lacquer" and Insulation by Polyamide Film.

A.A. Fedulova, et al. *Technology of Multi–Layer Print Boards*, Moscow, 1990 pp. 30–31, section 3.1, "Copper Foil".

U.N. Tschernjaev, et al., *Technology of Production of Integrated Macro–Circuits and Microprocessors*, Moscow, 1987, p. 46, section Metallization.

"Die Herstellung von Haftklebstoffen", BASF, Dec. 1979 (including English language translation).

*Handbook of Pressure–Sensitive Adhesive Technology*, Donatas Satas, New York, 1982, pp. 397–399, 481 and 572.

*Handbook of Pressure–Sensitive Adhesive Technology*, 2nd Ed. Donatas Satas, New York 1989, pp. 746, 747, 766, 767, 768 and 807.

Pressure–Sensitive PV Battery Covers From West Germany, Determination of the Commission in Investigation No. 731–TA–452 (Preliminary) Under the Tarriff Act of 1930, Together With the Information Obtained in the Investigation, USITC Publication 2265, Mar. 1990.

Letter dated May 5, 2000 from National Label Company Inc.

Draft of letter to Chinese Patent Office.

Excerpt from Dictionary of Adhesion Terms with pertaining translation. (No Date).

Publication Classification of Adhesives with a translation of the passages named in the notice of opposition. (No Date).

ADHESIVE LABEL

BACKGROUND OF THE INVENTION

The invention is directed to an adhesive label for application upon a circumferential surface of a dry-cell battery having an axis and top- and bottom-surfaces, comprising a stretched, shrinkable, transparent cover foil with a top side and a bottom side and an imprint visible from the top side located beneath the cover foil and a contact adhesive layer located beneath the imprint wherein the adhesive label comprises along a generating line of the circumferential surface of the battery first edge segments superimposable in an overlapping fashion and second edge segments protruding or projecting beyond the end surfaces of the battery, which rest upon the end surfaces due to shrinking the cover foil thereon.

The cover foil provides protection for the battery against leakage and furthermore protects the label layers located beneath same, in particular the imprint, from mechanical damage. In addition the cover foil insulates the circumferential surface of the battery electrically against the environment. If a layer beneath the cover foil is electrically conductive, the cover foil insulates also this layer against the environment. Various adhesive labels of this type are known from the DE 33 42 309. These conventional adhesive labels are produced in such a way, that several layers partially from shrinkable foil are applied on a carrier layer located at the bottom in the finished label, with the topmost of these layers being provided with an imprint. The cover foil must then be fastened to the label material carrying the imprint. In order for the cover foil to adhere to the imprint, it is necessary to apply beforehand a separate laminating adhesive layer upon the imprint. The laminating adhesive must satisfy particularly high requirements, in view of the adhesive label fulfilling its function of protecting against leakage, being non-fading as well as durable in storage.

SUMMARY OF THE INVENTION

It is thus the aim of the invention to specify an adhesive label of the above-mentioned type, which can be manufactured more simply particularly by a different method. It should be especially possible to meet the different requirements of different battery embodiments by a greater variability of the build-up of the layers.

In order to solve this task, the imprint is applied in the invented adhesive label directly to the bottom side of the cover foil.

Differing from the above mentioned known adhesive labels, the build-up of the different layers of the adhesive layer proceeds from the cover foil. The printing is applied directly to the cover foil. The imprinted cover foil can in further fabrication steps be placed upon a composite succession of previously prepared label layers, preferably however the additional layers are consecutively placed upon the cover foil carrying the imprint. One single shrinkable foil, the cover foil, is sufficient. Preferably a layer is placed upon the imprint-free partial surfaces of the cover foil, which again carries the contact adhesive layer on its other side. This layer provided with the contact adhesive can exhibit a prevalent carrier function for the label material or, however, it can assume a carrier function subordinate to the cover foil.

The layer carrying the contact adhesive can rest directly upon the imprint and upon the partial surfaces of the cover foil not covered by the imprint. Depending upon the material combination selected, the adhesive connection between the layer carrying the contact adhesive and the cover foil could be insufficient under unfavorable conditions. It is preferred for this case to apply, preferably thermosensitively, a transparent primer layer upon the imprinted cover foil and upon this transparent primer layer to then apply the layer carrying the contact adhesive.

The layer carrying the contact adhesive can be formed from non-metallic materials, as for instance paper or plastics, wherein it is preferred that this is limited to the partial surfaces of the adhesive labels with exception of the first border segments and thus corresponds exactly to the length of the circumferential surface of the battery. Alternatively the carrying layer can be formed also from metallic material, in particular by a layer applied by aluminum vapor deposition in a vacuum. The material selection depends on the desired appearance of the label from the outside, since the layer carrying the contact adhesive constitutes a background for the imprint visible from the outside.

Furthermore, the layer carrying the contact adhesive can be formed by a composite arrangement of a bottom non-metallic partial layer, in particular paper and a metallic partial layer especially from aluminum foil resting on same; said metallic partial layer is herein preferably limited to the partial surfaces of the adhesive label excluding the second border segments and thus corresponds exactly to the height of the battery cylinder of the battery. This version results in an appealing background for the imprint and a particularly thin aluminum foil can be used herein, without affecting the thickness of the adhesive label, in particular, when a cover foil dimensioned to be very thin is used.

Preferably, the metallic partial layer is applied to the non-metallic partial layer as a foil by the foil transfer method, meaning it is vapor-deposited or sputtered upon same.

In another particularly simple to manufacture embodiment, the contact adhesive layer lies directly upon the imprint and upon the partial surfaces of the cover foil devoid of the imprint. The layer carrying the contact adhesive in the above embodiments is eliminated. The cover foil is in this case the sole firm layer of the label and it alone assumes the carrier function. This embodiment can be manufactured to be particularly thin because of the low quantity of the layers, wherein the space, subject to standards specified for the dry cell battery, for filling same becomes larger.

The imprint is preferably printed upon the cover foil in colors from organic solutions or photocatalytic system without solvents by the mirror image action and reverse printing, meaning from below directly upon the cover foil in a mirror image manner, so that the imprint can be seen on the correct side from the top. These color systems are particularly suited for imprinting the shrinkable foil without changing or exfoliating in the course of the shrinkage process. Furthermore, they have the electric characteristics required for dry-cell batteries and are resistant to chemicals, which is particularly important in view of the leakage protection function of the battery label.

The cover foil is preferably made from shrinkable hard polyvinyl chloride, polypropylene, polystyrol, polyamide, particularly of a thickness of 25 to 60 micrometers or of polyethylene terephthalate or of polycarbonate, in particular of a thickness of 10 to 60 micrometers. So that the adhesive label after being shrunk upon the battery, adheres as firmly as possible and so that the adhesive label does not peel off the body of the battery also when subjected to unfavorable environmental conditions, the cover foil is stretched in circumferential direction of the dry-cell battery, so that the adhesive label has the greatest pre-stressing in circumferential direction after being shrunk on.

The various features of novelty which characterize the invention are pointed out with particularity in the claims annexed to and forming part of this disclosure. For a better understanding of the invention, its operating advantages and specific objects attained by its use, reference should be had to the accompanying drawings and descriptive matter in which there are illustrated and described preferred embodiments of the invention.

DESCRIPTION OF PREFERRED EMBODIMENTS

Figure 2:
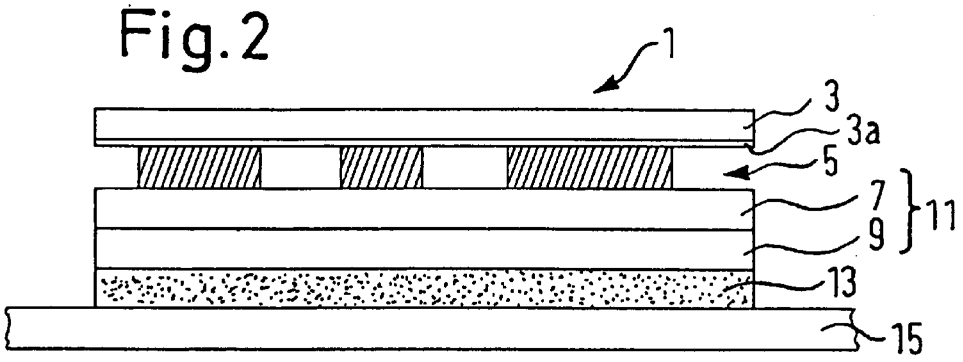
FIG. 2 Shows a first embodiment of an adhesive label in cross section.

FIG. 2 shows a diagrammatic section through a first embodiment of an adhesive label. In the course of fabrication a cover foil 3 from stretched, shrinkable, transparent foil from hard PVC (polyvinyl chloride), PP (polypropylene), OPP (oriented polypropylene), PET (polyethylene terephthalate), PS (polystyrene), PE (polyethylene), PC (polycarbonate), or polyamide with a thickness of 20 to 70 micrometers is provided directly on the bottom side with an imprint 5 visible from the outside. When a PET- or a PC-foil is used, thicknesses of 10 to 60 micrometers are preferred.

In case of using a PP-, OPP-, PS- or PE-foil by way of a cover foil 3, the cover foil, in view of the unpolarized properties of the foil material, is provided prior to application of the imprint 5 with an adhesion imparting primer layer 3*a* of a thickness of approximately 2 micrometers as a imprint adherence improvement agent. The primer layer 3*a* increases the surface tension.

In order to make the imprint 5 adhere to the cover foil 3 in a satisfactory manner also without a primer layer 3*a,* it is possible to polarize the cover foil 3 in the high frequency field with formation of caboxyle (corona treatment). The cover foil 3, the primer layer 3*a* and the imprint 5 are permanently resilient, so that the label can also be shrunk upon the battery, even if kept in storage for several months, without the imprint 5 detaching itself from the cover foil 3. The cover foil 3 is the only shrinkable plastics foil layer of the adhesive label. It can carry additional layers on the top and bottom side. The imprint 5 and those partial surfaces of the cover foil 3 not carrying the imprint are covered by a metal layer 7 particularly from aluminum using a vapor deposition or a sputtering method. The metal layer 7 forms a background for the imprint 5 visible from the outside and is electrically insulated against the outside by the cover foil 3. A non-metallic layer 9 from plastics foil or paper is applied upon the bottom side of the metal layer 7. The metal layer 7 and the non-metallic layer 9 together form a carrier material 11 of the label 1.

Alternatively the metal layer 7 can be applied upon the non-metallic layer 9 separately from the cover foil 3, possibly it can be vapor-deposited or sputtered thereon, and the carrier material 11 resulting from these two partial layers 7, 9 is fastened, possibly by means of a primer layer, upon the imprinted bottom side of the cover foil 3, in particular by the application of heat.

The carrier material involved is provided with contact adhesive 13 on its bottom side, and thus the finished label 1 is placed upon an adhesion repellent, possibly siliconized, carrier band or tape 15, from which it is later transferred to a battery body by a dispensing device not shown here.

FIG. 2 shows the imprint 5 only diagrammatically with intermediate spaces.

In this, as in all subsequently described embodiments, the imprint 5 can, however, also be an area closed in itself, multi-colored, multi-layered, a combination of non-transparent printing colors and/or opaque printing colors. Special metal colors, thus also particles of an area wide vapor deposition brought into solution, also form a particularly closed in itself colored layer.

Figure 1:
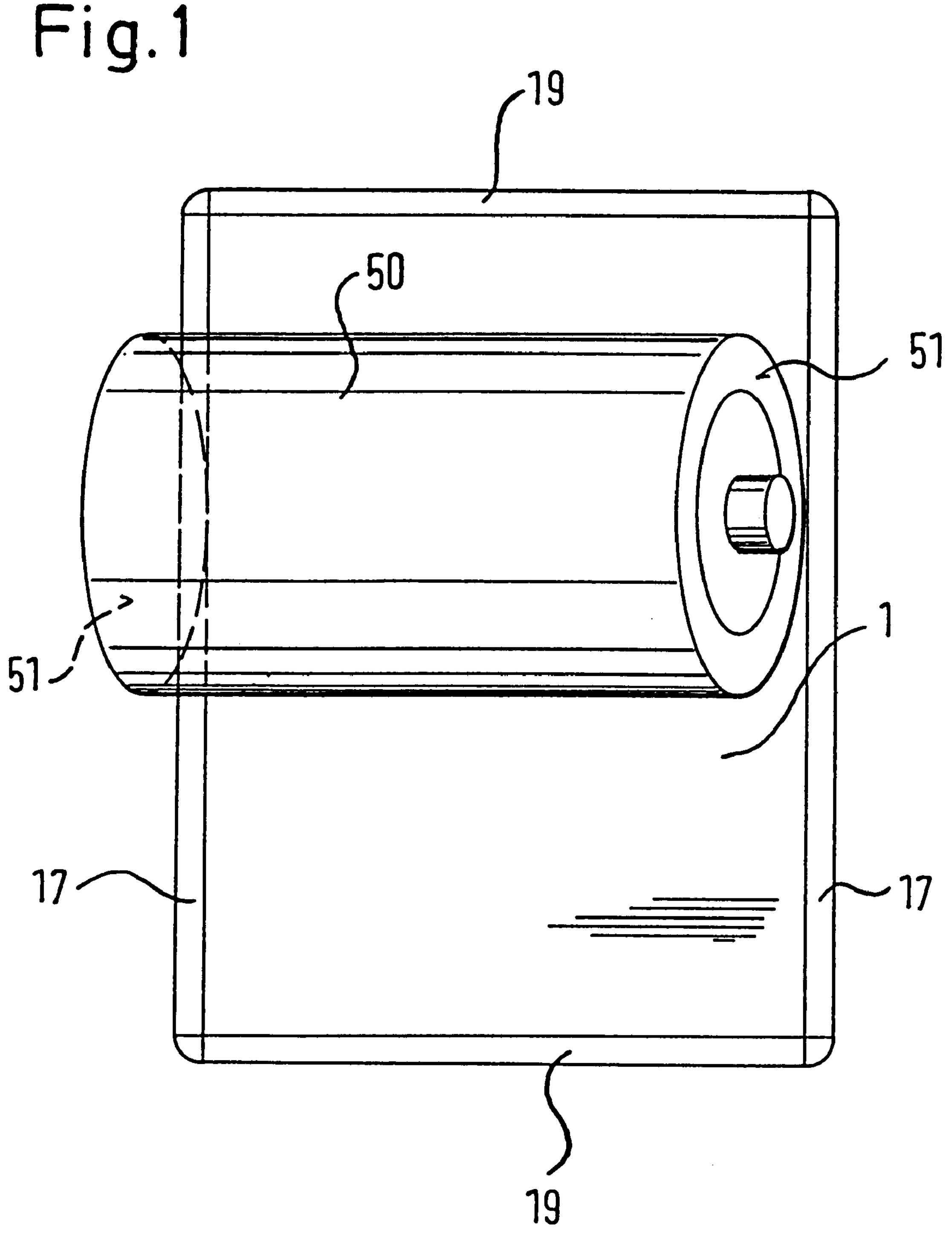
FIG. 1 Shows diagrammatically the application of an adhesive label upon a cylindrical body of a dry-cell battery.

FIG. 1 shows diagrammatically the application of the adhesive label 1 upon a cylindrical battery body 50 of a rechargeable or non-rechargeable dry cell or appliance battery. The adhesive label 1 is placed with its contact adhesive layer 13 upon the circumference of the battery body 50 in such a way, that its longitudinal edges 17, not imprinted upon and having no carrier material 11, protrude beyond the end-surfaces 51, 51 of the battery body 50, wherein in particular the stretching direction of cover foil 3 runs in circumferential direction of the battery body 50. Then the adhesive label 1 is placed around the circumference of the battery body 50, so that the end regions 19, 19 of the adhesive label 1 overlap one another. Subsequently, the adhesive label is shrunk upon the battery body 50 by application of heat, so that the longitudinal edges 17 rest upon the end surfaces 51, 51 of the battery body 50 and additionally adhere to the end faces 51, 51 due to the contact adhesive 13. Due to the overlapping end regions 19, 19 and the longitudinal edges 17 resting upon the end surfaces of the battery body 50, the adhesive label encapsulates the battery body 50 and provides, in addition to the electric insulation of the cell, a protection against leakage. The externally located cover layer 3 protects the layers located beneath it from damage, in particular during the fabrication process of the battery beginning with the application of the label up to the packaging of the finished battery and resists also mechanical stresses in battery layers of the appliances being used.

Figure 3:
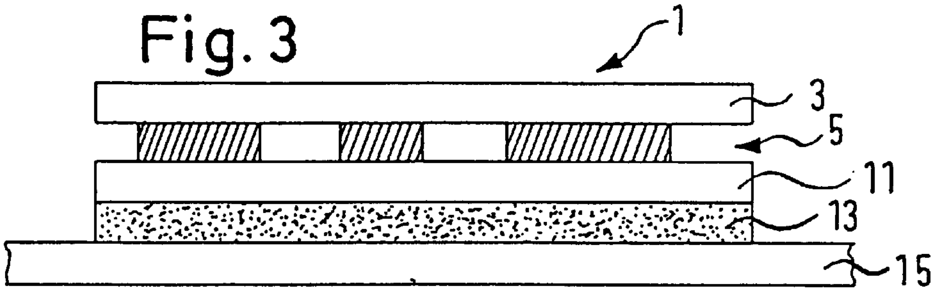
FIG. 3 Shows a second embodiment of an adhesive label in cross section.

FIG. 3 shows a second embodiment of the adhesive label 1. It differs from the version shown in FIG. 2 in that the carrier material 11 is a single layer. If the carrier material 11 is from metal, such as possibly aluminum, it can be vapor-deposited or sputtered upon the imprinted bottom side of the cover foil 3, possibly at a thickness of 2 to 7 Å. Alternatively, the metal layer 11 can be applied to a carrier not shown here, separately from the cover foil 3, from which carrier it is then transferred by means of a thermo-sensitive intermediate layer upon the imprint 5. This carrier represents preferably a foil acting as a system-conditioned assist means, which is pulled off after the transfer of the metal layer and is subsequently rolled up, thus no longer participating in the buildup of the layers. The contact adhesive 13 is applied directly upon the metal layer 11. Here also the cover foil 3 can, if necessary, be provided with a primer layer 3*a* or subjected to a high frequency treatment prior to the imprinting process.

Figure 4:
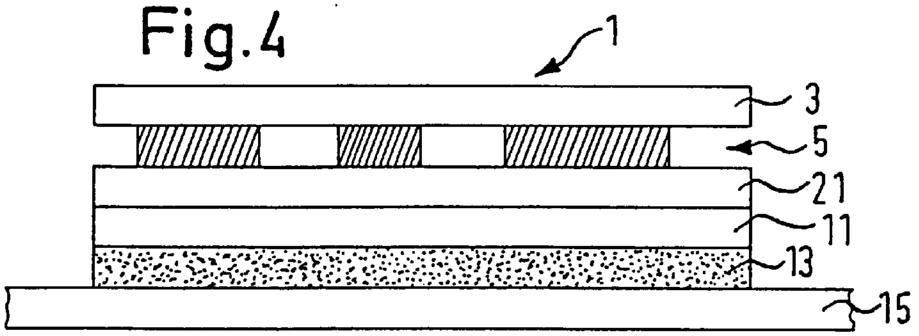
FIG. 4 Shows a third embodiment of an adhesive label in cross section.

FIG. 4 shows a third embodiment of the adhesive label 1 similar to FIG. 3 having a single layer carrier material 11. The carrier material 11 consists of paper or plastics and is placed upon the imprinted bottom side of the cover foil 3 by means of a laminating adhesive layer 21 located in between. The laminating adhesive layer 21 is applied as a lacquer or glue in a liquid or semi-liquid phase and is cured or hardened by chemical reaction of the binder and the hardener component parts, by irradiation and/or by release of solvents. The laminating adhesive layer 21 can be pigmented in case of an imprint which is not closed in itself area-wise and can constitute an optical background for the imprint 5. The laminating adhesive layer 21 improves the adhesion of the carrier material 11 upon the imprinted bottom side of the cover foil 3. The laminating adhesive layer 21 has a thickness of 3.5 to 5 micrometers corresponding to 2.5 to 4 grams per meter square and forms a barrier against diffusion of solvents from the contact adhesive layer 13 located beneath same into the imprint and thereby its changing if kept in storage for a long time. The laminating adhesive layer 21 is an additional barrier against migrations of electrolyte and improves at the same time the electrical insulation properties of the label, without having to use an additional insulation layer. In this case also, the cover foil 3 can, if needed, be provided with a primer layer 3*a* prior to imprinting or it can be subjected to a high frequency treatment.

Figure 5:
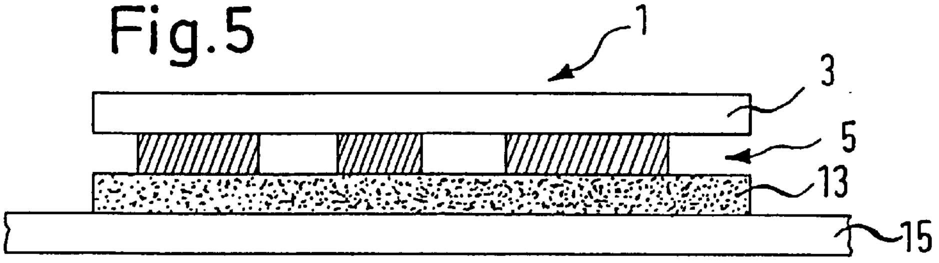
FIG. 5 Shows a fourth embodiment of an adhesive label in cross section.

FIG. 5 shows a fourth embodiment. As in previous embodiments an imprint 5 is directly provided to the cover foil 3 on its bottom side. Differing from the above versions, no separate carrier layer follows thereon, rather, the contact adhesive layer 13 is directly applied upon the imprinted bottom side of the cover foil 3. The cover foil 3 assumes here the sole carrier function for the adhesive label. The imprint 5 can be closed in itself area wise, so the surface of the battery body located beneath it is not visible. The imprint 5 improves the electric insulation of the label and prevents a diffusion of solvents from the contact pressure layer 13 or from electrolyte residues on the battery surface. The contact pressure layer 13 can be colored and forms then an optical background for an opaque imprint which is not closed in itself area wise. Here also, the cover foil 3 can if needed, be provided with a primer layer 3*a* prior to imprinting same or can be subjected to a high frequency treatment.

Figure 6:
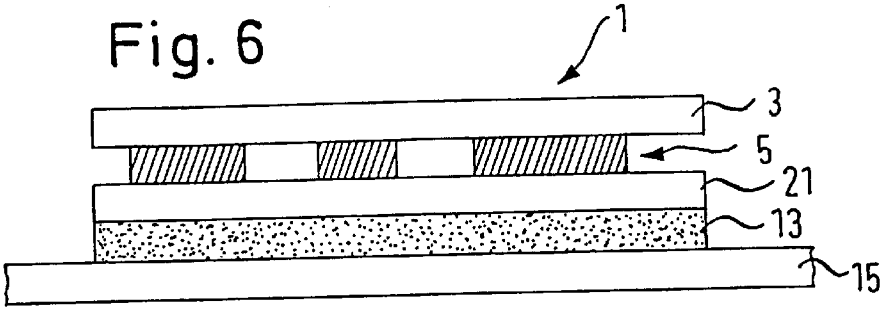
FIG. 6 Shows a fifth embodiment of an adhesive label in cross section.

FIG. 6 shows a fifth embodiment similar to FIG. 5, whose imprint 5 carries however a laminating adhesive layer 21 on its bottom side similar to the one in FIG. 4. The laminated adhesive layer 21 is applied as a lacquer or glue in a liquid or a semi-liquid phase and hardens in a chemical reaction of binder-and-hardner components by irradiation and/or by a release of solvents. The laminating adhesive layer 21 can be pigmented in case the imprint is not closed within itself area wise and can form an optical background for the imprint 5. Furthermore, the laminating adhesive layer 21 also fulfills the function of a barrier against diffusion of solvents from the contact adhesive layer 13 applied on the bottom side of the laminating adhesive layer 21 or from electrolytes upon the surface of the battery body into the imprint 5 and protects said imprint from changes. This improves the durability of adhesion and the storage endurance of the label also under unfavorable conditions, such as high temperature and humidity. Here also the cover foil 3 can be provided with a primer layer 3*a* if needed prior to imprinting same or be subjected to a high frequency treatment.

Figure 7:
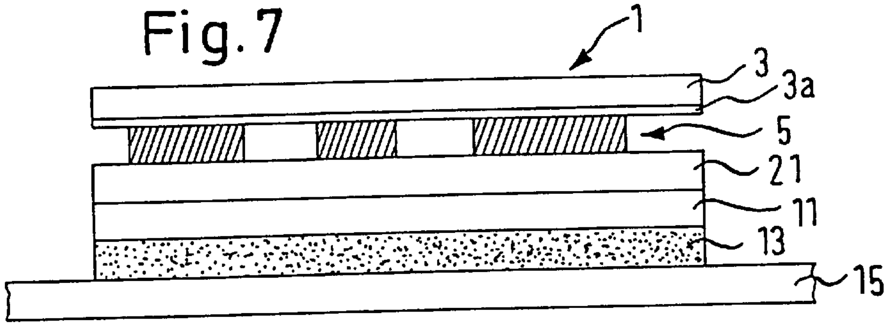
FIG. 7 Shows a sixth embodiment of an adhesive label in cross section.

FIG. 7 shows a sixth variant. The cover layer 3, the primer layer 3*a* possibly present in case of an unpolarized foil and the imprint 5 correspond to the version in FIG. 3. A laminating adhesive layer 21 corresponding to the embodiment in FIG. 4 is applied upon the imprint 5 and the partial surfaces of the cover layer 3 devoid of said imprint.

The laminating adhesive layer 21 improves the adhesion of a metal layer 7 placed upon same, for instance from aluminum corresponding to the version in FIG. 3. This metal layer 7 is sputtered or vapor-deposited at a thickness of 2 to 7 Å. Because of the micropartial accumulation or superposition of metal particles, the metal layer 7 is porous and has a clearly higher electrical resistance than metal foil. The metal layer 7 covers additionally unavoidable contaminations and stains upon the battery body 50.

Alternatively the metal layer 7 can be also be transferred as a foil to the laminating adhesive layer 21 by the transfer method. Herein, a metal foil 7 adhering to its proper carrier tape is placed upon the more firmly adhering laminating adhesive layer 21. Then the carrier tape having a low adhesion is pulled off the metal layer firmly adhering to the label material.

The laminating adhesive layer 21 constitutes a resilient connection between the metal layer 7 and the cover foil 3. This resilient connection prevents the metal layer from being distorted during shrinkage of the foil and in the course of labeling upon narrow radii of the battery body. The resilient connection absorbs shearing forces and warping in the label. At the same time, the resilient connection forms the barrier described previously in connection with FIG. 4, which prevents solvents from the contact adhesive 13, which can have penetrated into the pores of the metal layer 7, from diffusing into the imprint and changing same, as well as considerably improving the electrical insulation. The laminating adhesive 21, which has penetrated into the pores of the metal layer, hardens or cures said metal layer.

The laminating adhesive layer 21 can be a lacquer which, after being applied in liquid or semi liquid state, is hardened or cured by a chemical reaction of the binder and hardner component parts, irradiation and/or by perspiration of solvents. Prior to sputtering or vapor depositing the metal layer 7, it is possible to permit the laminating adhesive 21 to cure or harden. In case of the superposition of a metal foil, possibly by the foil transfer method, it is possible to place the metal foil on the not yet cured or hardened laminating adhesive layer 21, in order to utilize the adhering effect of the not yet cured lacquer. The laminating adhesive layer 21 can contain pigments for formation of an optical background for the imprint 5.

The contact adhesive layer 13 has, just as in the previous versions, a thickness of 10 to 25 micrometers and insulates the metal layer 7 electrically against the battery body 15. In case of using the laminating adhesive layer 21, the contact adhesive layer 13 can be thinner than 15 micrometers, since the laminating adhesive layer 21 has also insulating properties.

The contact adhesive 13 which has penetrated into the pores of the metal layer 7 insulates the pores and increases thus the electrical resistance of the metal layer 7.

The adhesion of the individual label layers must be arranged in such a way in the overlapping region 19 (FIG. 1) of the adhesive label, that, with the label placed upon the battery body 50, the stress in the shrunk cover foil 3 does not rip the laminating adhesive layer 21.

The laminating adhesive layer 21 is preferably a two-component adhesive or—lacquer including a binder and hardener, and the contact adhesive 13 represents as a rule a permanently resilient single component adhesive with stabilizers such as antioxidants, which prevent a hardening or curing and with this spalling as a result of an area rupture with a simultaneous high shear force in the contact region. Thereby, the laminating adhesive layer 21 adheres in the hardened state more strongly than the not hardened one and therefore permanently resilient contact adhesive 13. The adherence effect of the contact adhesive 13 in the overlapping region 19 of the cover foil 3 is adapted to the adhesive effect to the battery body 50 between the overlapping regions in such a way, that bursting of the overlap 19 is prevented.

Figure 8:
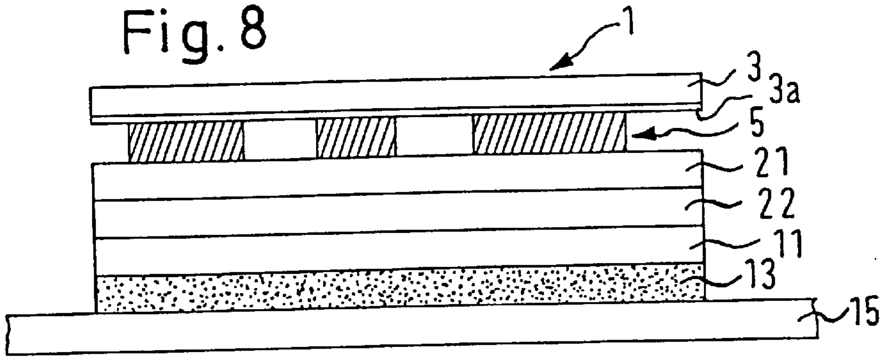
FIG. 8 Shows a seventh embodiment of an adhesive label in cross section, and FIG. 9 Shows an eighth embodiment of an adhesive label in cross section.

FIG. 8 shows a seventh version, which differs from the version in FIG. 7 as far as the layer buildup between the imprint 5 and the metal layer 7 is concerned, otherwise, however, is identical to the version shown in FIG. 7 with all its embodiment variants.

The laminating adhesive layer 21 applied to the imprint 5, which can correspond in its component parts to the version in FIG. 7, is resilient and forms a resilient connection between the cover foil 3 and the metal layer 7, so that said metal layer 7 is not damaged, possibly undulates or tears apart in the course of shrinking the cover foil 3 upon the battery body. This resilient connection absorbs shearing forces and warping in the label. The laminating adhesive layer 21 adheres more strongly than the contact adhesive 13.

A lacquer layer 22 is applied on the bottom side of the laminating adhesive layer 21, which lacquer layer 22 is harder and/or more dense than the laminating adhesive layer 21 and which assumes the barrier function described in connection with FIG. 7 against diffusion of solvents from the contact adhesive layer 13 or from electrolytes on the battery surface into the imprint 5. It is easy to sputter or vapor-deposit metal upon the lacquer layer 22 because of its strength and the thus treated lacquer layer 22 prevents passage of such solvents from the contact adhesive layer 13 and of electrolytes on the battery surface, which have already penetrated through the pores in the metal layer 7.

The laminating adhesive layer 21 and/or the lacquer layer 22 can be pigmented and can form an optical background for the imprint.

Figure 9:
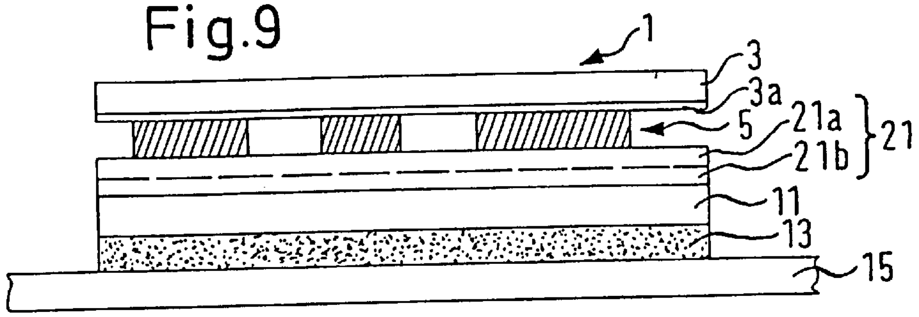

FIG. 9 shows an eighth version similar to FIGS. 7 and 8, however, with a modified laminating adhesive layer 21 which as far as its component parts are concerned can be configured to correspond to the embodiment shown in FIG. 7. The laminating adhesive layer 21 is applied upon the imprint 5 in a liquid or semi-liquid state and is subsequently partially cured or hardened in such a way by curing or hardening of the binder and the hardener shares by radiation and/or perspiration of solvents, that a resilient partial layer 21*a* resting upon the imprints and a harder partial layer 21*b* remote from the imprint 5 is formed, upon which subsequently the metal layer 7 can be very easily sputtered or vapor-deposited. The resilient partial layer 21*a* serves as a resilient connection between the cover foil 3 and the metal layer 7, with the effect of the laminating adhesive layer 21 in the embodiment shown in FIG. 8, and the harder partial layer 21*b* forms the barrier layer with the effect of the lacquer layer 22 in the version shown in FIG. 8 against diffusion of solvents from the contact adhesive layer 13 and of electrolytes on the battery surface through the pores in the metal layer 7 into the imprint 5. A laminating adhesive layer 21 and/or the lacquer layer 22 can be pigmented for formation of an optical background for the imprint 5.

A plurality of adhesive labels adheres detachably to a siliconized carrier band or tape 15.

While specific embodiments of the invention have been shown and described in detail to illustrate the application of the inventive principles, it will be understood that the invention may be embodied otherwise without departing from such principles.

What is claimed is:

1. An adhesive label for application upon a circumferential surface of a dry cell battery (50), said label comprising:

a stretched, shrinkable, transparent cover foil (3) constituting the sole foil layer of said adhesive label (1);

an imprint (5) being applied directly upon a bottom side of said cover foil (3) and being visible from a top side of said adhesive label (1), said bottom side of said cover foil (3) being optionally pretreated in an adhesion-imparting manner or being optionally provided with an adhesion-imparting primer layer (3*a*);

a contact adhesive layer (13) located beneath said imprint (5); and a layer (21) which is located between said imprint (5) and said contact adhesive layer (13) and is applied directly upon said imprint (5) and upon any partial surfaces of said cover foil (3) devoid of said imprint (5) and is applied from a liquid or semi-liquid phase, said layer (21) forming a barrier against migration of solvent of said contact adhesive layer (13) and/or of electrolyte present on said battery (50) into said imprint (5).

wherein said adhesive label (1) has, along a generatrix of said circumferential surface of said battery (50), first edge portions (19) which can be superimposed in an overlapping manner, and second edge portions (17) projecting beyond end surfaces (51) of said battery (50) and resting upon said end surfaces (51) after shrinkage of said cover foil (3).

2. The adhesive label according to claim 1, characterized in that said barrier layer (21) carries directly on its bottom side said contact adhesive layer (13).

3. The adhesive label according to claim 1, characterized in that said barrier layer (21) is a laminating adhesive layer and connects a metal layer (7) to said imprint (5).

4. The adhesive label according to claim 3, characterized in that said laminating adhesive layer forms a resilient connection between said imprint (5) and said metal layer (7).

5. The adhesive label according to claim 3, characterized in that said laminating adhesive layer connects the metal layer to the imprint such to adhere more strongly than said contact adhesive layer (13) adheres the metal layer to a battery to which the label is applied.

6. An adhesive label for application upon a circumferential surface of a dry cell battery (50), said label comprising:

a stretched, shrinkable, transparent cover foil (3);

an imprint (5) being applied directly upon a bottom side of said cover foil (3) and being visible from a top side of said adhesive label (1), said bottom side of said cover foil (3) being optionally pretreated in an adhesion-imparting manner or being optionally provided with an adhesion-imparting primer layer (3*a*);

a contact adhesive layer (13) located beneath said imprint (5);

a flexible laminating adhesive layer (21;21*a*) which is applied upon said imprint (5) and upon any partial surfaces of said cover foil (3) devoid of said imprint (5) and absorbs mechanical stresses in said adhesive label (1), and a harder lacquer layer (22;21*b*) lying upon said flexible laminating adhesive layer (21;21*a*) and constituting a barrier against migration of solvent of said contact adhesive layer (13) and/or of electrolyte present on said battery (50) into said imprint (5), wherein said adhesive label (1) has, along a generatrix of said circumferential surface of said battery (50), first edge portions (19) which can be superimposed in an overlapping manner, and second edge portions (17) projecting beyond end surfaces (51) of said battery (50) and resting upon said end surfaces (51) after shrinkage of said cover foil (3).

7. The adhesive label according to label to claim 6, characterized in that a metal layer (7) is sputtered or vapor-deposited upon said lacquer layer (22; 21$b$).

8. The adhesive label according to claim 7, characterized in that said metal layer (7) carries said contact adhesive layer (13) on its bottom side.

9. The adhesive label according to claim 6, characterized in that said laminating adhesive layer (21) and said lacquer layer (22) are separately applied layers.

10. The adhesive label according to claim 6, characterized in that said laminating adhesive layer (21; 21$a$) and said lacquer layer (22; 21$b$) have identical ingredients.

11. The adhesive label according to claim 10, characterized in that said laminating adhesive layer (21$a$) and said lacquer layer (21$b$) are applied as a common layer upon said imprint (5), and, after said layer has been applied, same is hardened to a greater extent on its side remote from said imprint (5), while forming said lacquer layer (21$b$), than on its side constituting said laminating adhesive layer (21$a$) and resting upon said imprint (5).

12. The adhesive label according to claim 1 or 6, characterized in that at least one layer visible from the top through said imprint (5) is colored or pigmented.

13. The adhesive label according to claim 1 or 6, characterized in that said imprint (5) is printed upon said cover foil (3) in printing inks from an organic-solvent-based printing ink system or from a solvent-free photocatalytic printing ink system as a mirror image by reverse printing.

14. The adhesive label according to claim 1 or 6, characterized in that said cover foil (3) is formed from oriented hard polyvinyl chloride, polypropylene, polystyrene, polyamide, or polyethylene terephthalate, or polycarbonate.

15. The adhesive layer of claim 14, wherein the cover foil is of a thickness of 20 to 70 micrometers and is formed from oriented hard polyvinyl chloride, polypropylene, polystyrene or polyamide.

16. The adhesive layer of claim 14, wherein the cover foil is of a thickness of 10 to 60 micrometers and is formed from polyethylene terephthalate or polycarbonate.

17. A dry cell battery having an adhesive label according to claim 1 or 6.

18. The adhesive label according to claim 1 or 6, wherein said barrier layer is hardened by a chemical reaction, irradiation and/or removal of solvents.

19. The adhesive label of claim 18, wherein the chemical reaction is a binder and hardener components.

* * * * *